United States Patent [19]
Yang et al.

[11] Patent Number: 6,038,204
[45] Date of Patent: Mar. 14, 2000

[54] OPTICAL SOURCE MODULE FOR GENERATING BEAMS WITH DIFFERENT WAVELENGTHS

[75] Inventors: Keun Young Yang; Jong Uk Bu, both of Kyungki-Do, Rep. of Korea

[73] Assignee: LG Electronics Inc., Seoul, Rep. of Korea

[21] Appl. No.: 08/907,886

[22] Filed: Aug. 11, 1997

[30] Foreign Application Priority Data

Jul. 10, 1999 [KR] Rep. of Korea .................. 97-32095

[51] Int. Cl.[7] .................................................. G11B 7/00
[52] U.S. Cl. .................. 369/121; 369/94; 369/44.23; 369/44.37; 369/112
[58] Field of Search ............................ 369/121, 112, 369/94, 44.23, 44.37, 109

[56] References Cited

U.S. PATENT DOCUMENTS

| 5,208,801 | 5/1993 | Finegan | 369/44.23 |
| 5,627,814 | 5/1997 | Lee | 369/94 |
| 5,696,750 | 12/1997 | Katayama | 369/112 |

*Primary Examiner*—Tod R. Swann
*Assistant Examiner*—Kim-Kwok Chu

[57] ABSTRACT

A different wavelength type of optical source module which generates light beams different in wavelength. In the optical source module, laser diodes are provided to be opposed to each of reflective films which is arranged to make a shape of a mountain. These respective laser diodes generates laser light beams different in wavelength. The light beams generated at the laser diodes are reflected by the reflective films at a right angle to progress along the same path.

32 Claims, 8 Drawing Sheets

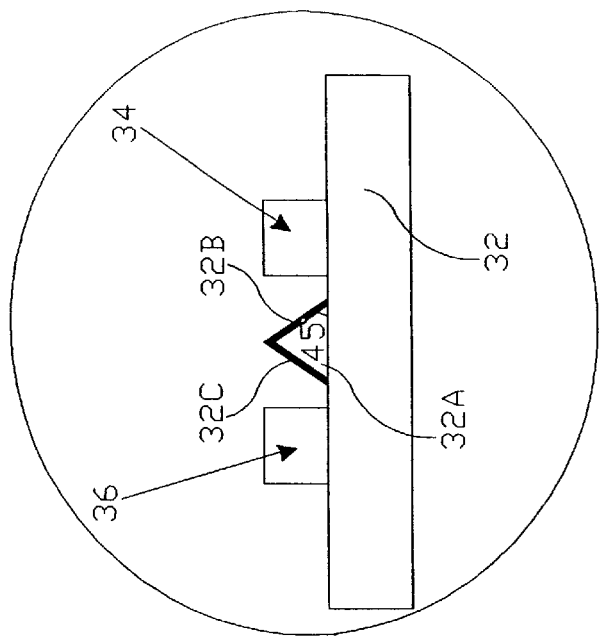
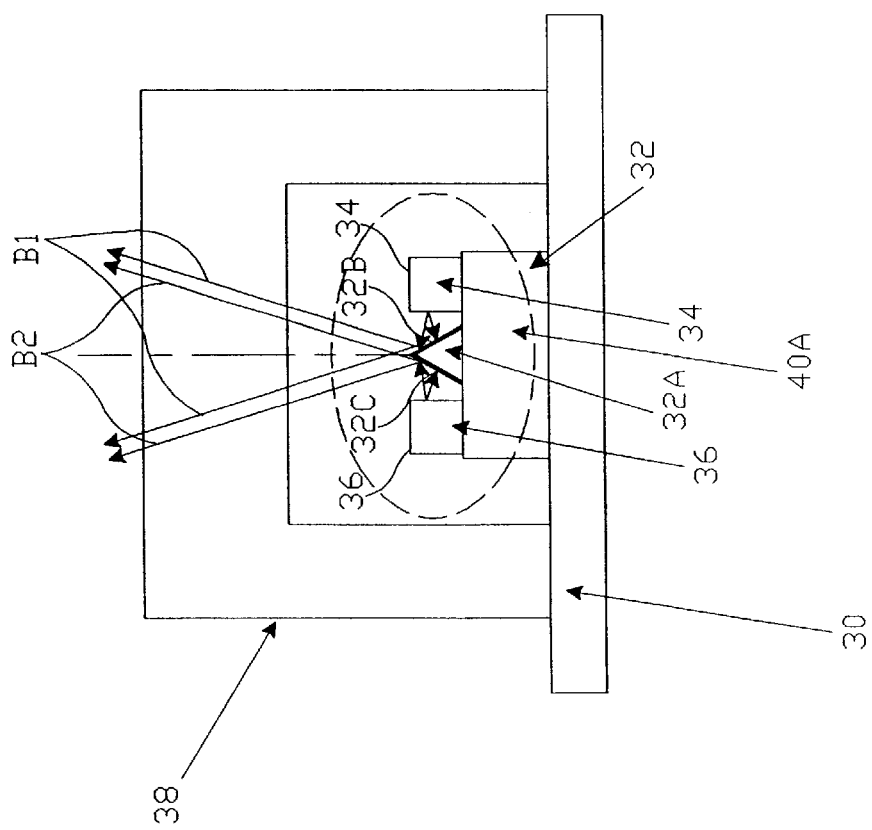
Fig. 2 (B)
Fig. 2 (A)

OPTICAL SOURCE MODULE FOR GENERATING BEAMS WITH DIFFERENT WAVELENGTHS

BACKGROUND OF THE INVENTION

1. Field of the Invention

This invention relates to an optical source module for generating light beams having different wavelengths and a manufacturing method thereof. Also, the invention is directed to an optical pickup apparatus which reads different types of optical recording media by employing the optical source module generating different wavelengths of beams.

2. Description of Related Art

In the recent development of recording media, the ability to record a higher capacity of information in accordance with the change into a large-scale of information quantity has become a requirement. Accordingly, an optical disc showing a remarkable increase of an occupation rate in the recording medium market also has been being developed such that it is possible to record large amounts of information. As a result, in the optical disc market, the digital versatile or video disc (hereinafter referred simply to as "CD") or the rewritable compact disc of write once read many (WORM) type (hereinafter referred simply to as "CD-R"). The DVD not only has a recording density than the CD and CD-R, that is, in the track density, but is also shorter than the CD and CD-R in a distance extending from the disc surface to the information recording face. In fact, the distance from the disc surface to the information recording face in the DVD is 0.6 mm while the distance in the CD and CD-R is 1.2 mm. Further, the information recording faces of the DVD and the CD-R have a different reflection ratio depending upon the wavelength of light beam incident thereon. Specifically, the reflection ratio in the information recording face of the CD-R is at a maximum value with a wavelength of 780 nm while the reflection ratio of the DVD is at a maximum value in the case of a wavelength of 650 nm. As described above, as optical discs having different structures and characteristics become commercially available, an optical pickup will need a capability of accessing all types of optical discs, such as CD, CD-R and DVD.

In order to satisfy this need, an optical pickup apparatus adopting a two beam system which employs two light sources has been suggested. As shown in FIG. 1, the two beam system optical pickup apparatus comprises first and second light sources 10 and 12 which are separately installed for generating light beams of 650 nm and 780 nm, respectively, and first beam splitter 14 for matching paths of the light beams from light sources 10 and 12. The first light source 10 generates a light beam having a wavelength of 650 nm (hereinafter referred to as first light beam B1) when accessing a DVD 11, and supplies first light beam B1 via first collimator lens 16 to first beam splitter 14. On the other hand, the second light source 12 generates a light beam with a wavelength of 780 nm (hereinafter referred to as the second light beam B2) when accessing a CD or CD-R 13, and supplies second light beam B2 via second collimator lens 18 to first beam splitter 14. Herein, the first light source 10 is arranged in an optional position making a horizontal line with respect to the first beam splitter 14 (for example, the right side of FIG. 1) while the second light source 12 is arranged in an optional position making a vertical line with respect to the first beam splitter 14 (for example, the upper side of FIG. 1), respectively, in such a manner that respective paths of first light beam B1 and second light beam B2 make a right angle with respect to each other. Accordingly, first beam splitter 14 transmits the first light beam B1 as is, while it reflects the second light beam B2 at a right angle thereto, to thereby match the path of the first light beam B1 with that of the second light beam B2. The first light beam B1 from the first beam splitter 14 is converged onto an information recording face 11A, by way of second beam splitter 20, a right angle reflective glass 22, and an objective lens 24, in turn, in the shape of spot. Subsequently, the light beam reflected by an information recording face 11A of the DVD 11 arrives at the surface of a multiple divisional photo detector 28 by way of the object lens 24, the right angle reflective glass 22, the second beam splitter 20, and a sensor lens 26, in turn. In a similar manner, the second light beam B2 from the first beam splitter 14 is converged onto an information recording face 13A of the CD or CD-R 13, via the second beam splitter 20, the right angle reflective glass 22 and the objective lens 24, in turn, in a shape of spot, and is thereafter reflected by the information recording face 13A of the CD or CD-R 13. Further, this reflected light beam progresses toward the multi-divisional photo detector 28 by way of the objective lens 24, the right angle reflective glass 22, the second beam splitter 20 and the sensor lens 26, in turn. Accordingly, the multi-divisional photo detector 28 converts the light beam incident thereto from the sensor lens 26 into an electrical signal. This electrical signal includes information recorded on the CD or CD-R 13, or the DVD 11.

The above-described optical pickup apparatus using a two beam system, however, requires additional optical devices in order to align the progressive paths of the light beams from the respective light sources. Because of this, the two beam system optical pickup apparatus has disadvantages in that it has a complicated configuration as well as being large bulky. To overcome these disadvantages of the two beam system optical pickup apparatus, various optical pickup apparatuses such as holographic, liquid crystal shutter, and annular shield have been devised, which are capable of accessing CD, CD-R and DVD discs utilizing a single light beam. Firstly, the holographic optical pickup apparatus allows two diffractive light beams different in flux diameter to be incident on the objective lens by utilizing the hologram lens, thereby forming a focus onto all the information recording faces of the CD or CD-R and the DVD. Secondly, the liquid crystal shutter optical pickup apparatus controls the flux diameter of the light beam incident on the objective lens by utilizing a liquid crystal plate and a polarizer plate, thereby converging the light beam onto the information recording face of the CD or CD-R, or the DVD. Finally, the annular shield type of optical pickup apparatus converges the light beam onto all of the recording faces of the CD or CD-R and DVD in such a manner that a side lobe is not generated by utilizing an objective lens having an annular band formed in the surface thereof.

These optical pickup apparatuses each can converge the light beam onto the information recording faces of each of the CD, CD-R and DVD by changing a focus distance of the objective lens, but cannot read out the information recorded on the CD-R. This is because the reflection ratios in the information recording face of the CD-R and the information recording face of the DVD are different depending upon a wavelength of light beam. In other words, the reflection ratio in the information recording face of the CD-R has a maximum value at a wavelength of 650 nm. This results in the conventional holographic, liquid crystal shutter, and annular shield optical pickup apparatuses being not compatible with each of the CD, CD-R and DVD.

SUMMARY OF THE INVENTION

Accordingly, it is an object of the present invention to provide an optical source module which can generate light beams having different wavelengths, and a manufacturing method thereof.

It is another object of the present invention to provide an optical pickup apparatus with a simplified configuration as well as a reduced bulk thereof by employing the above-mentioned optical source module.

In order to obtain these and other objects of the invention, according to one aspect of the present invention, an optical source module comprises first and second reflective films arranged to define a shape of a mountain (i.e., having a common edge and being at an angle to each other), and first and second light source provided so as to be opposed to the first and second reflective films, respectively, for generating light beams having different wavelengths with respect to each other.

Further, according to another aspect of the present invention, an optical source module comprises a support in which a submount is defined, the submount having at least two sloped portions, at least two reflective films formed on each of the at least two sloped portions, and at least two light sources provided on a surface of the said support so as to be opposed to each of the at least two reflective films.

Furthermore, according to another aspect of the present invention, an optical source module comprises a submount having at least two sloped portions, at least two reflective films formed on each of the at least two sloped portions, a support member for supporting the submount, the support member having at least two jaws extending in such a manner as to be at a higher level than a lower end of the submount, at a position opposed to each of the at least two sloped portions, and at least two light sources provided on each of the at least two jaws to generate light beams having different wavelengths from each other.

Furthermore, according to still another aspect of the present invention, a manufacturing method of an optical source module comprises defining a submount having at least two sloped portions on a semiconductor substrate, forming reflective films on each of the at least two sloped portions, and providing at least two light sources on the semiconductor substrate to be opposed to the at least two sloped portions having reflective film formed thereon.

Furthermore, according to still another aspect of the present invention, a manufacturing method of an optical source module comprises defining a submount having at least two sloped portions on a semiconductor substrate, forming at least two jaws extending in such a manner to be at a higher level than the lower end of the submount at a position on the semiconductor substrate opposed to each of the at least two sloped portions, forming reflective films on each of the at least two sloped portions, and providing at least two light sources on respective surfaces of the at least two jaws.

Furthermore, according to still another aspect of the present invention, an optical pickup apparatus comprises an optical source module for generating light beams having different wavelengths depending upon a kind of optical disc being read, a photo detector for converting light beams reflected by the optical disc into electrical signals, and a light path guide for guiding the light beams from the optical source module toward the optical disc and the light beams reflected by the optical disc toward the photo detector, respectively.

Furthermore, according to still another aspect of the present invention, an optical pickup apparatus comprises an optical source module for generating light beams having different wavelengths depending upon a kind of optical disc being read, a convergence device for converging the light beams from the optical source module onto a surface of the optical disc, a photo detector for converting light beams reflected by the optical disc into electrical signals, and an optical separation device arranged among the convergence device, the optical source module and the photo detector for delivering the light beams from the optical source module into the convergence device and the light beams reflected from the optical disc via the convergence device into the photo detector.

BRIEF DESCRIPTION OF THE DRAWINGS

These and other objects of the invention will be apparent from the following detailed description of the embodiments of the present invention, with reference to the accompanying drawings, in which:

FIGS. 2(A) and 2(B) are schematic views of an optical source module according to an embodiment of the present invention.

DETAILED DESCRIPTION OF THE PREFERRED EMBODIMENTS

Figure 1:
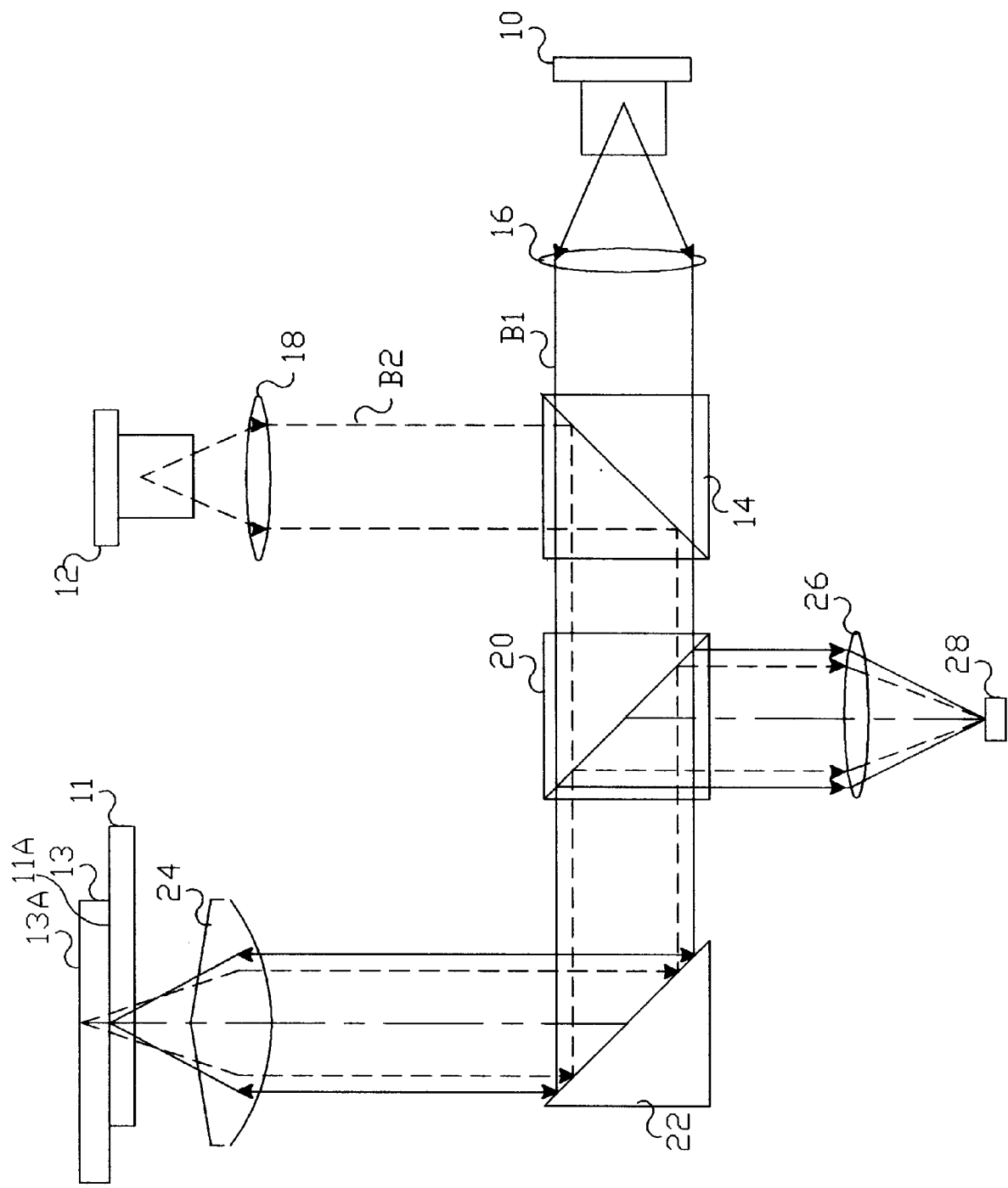
FIG. 1 is a schematic view of a conventional optical pickup apparatus.

Referring to FIGS. 2(A) and 2(B), an optical source module according to an embodiment of the present invention is shown which comprises a hexahedron support member 32 disposed on an upper portion of stem 30. This support member 32 is provided with a submount 32A which intersects the surface thereof at left and right sides thereof and has the shape of a mountain. First and second reflective films 32B and 32C are formed on the respective sloped portions of submount 32A. The first reflective film 32B makes an angle of 132° with respect to the surface of the support member 32 while the second reflective film 32C makes an angle of 45° with respect to the surface of the support member 32.

Further, first and second laser diodes 34 and 36 are arranged at the right and left sides of the surface of the support member 32, respectively, so as to be opposed to the first and second reflective films 32B and 32C, respectively. The first laser diode 34 generates a first light beam B1 with a wavelength of 650 nm. This first light beam B1 is reflected by the first reflective film 32B in a direction perpendicular to the surface of the support member 32. On the other hand, the second laser diode 36 generates a second light beam B2 with a wavelength of 780 nm. This second light beam is also reflected by the second reflective film 32C in a direction perpendicular to the surface of the support member 32.

Moreover, a cap 38 is formed in the upper portion of the stem 30 to cover the support member 32. This cap 32 allows the periphery of the laser diodes 34 and 36 (including the support member 32) to be maintained in a vacuum and prevents particles such as dust from permeating into laser diodes 34 and 36, so that laser diodes 34 and 36 are not contaminated.

Figure 3:
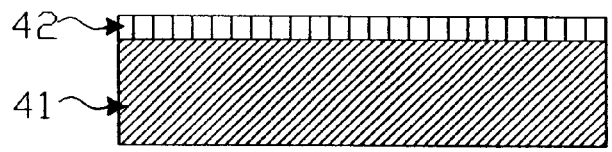
FIGS. 3(A)–3(E) are sectional views for explaining steps in a method of manufacturing the optical source module according to an embodiment of the present invention.
Figure 3:
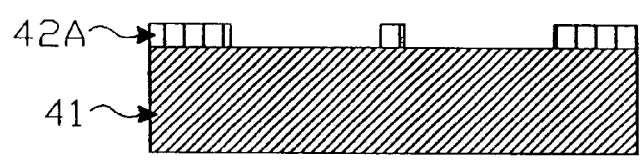
Figure 3:
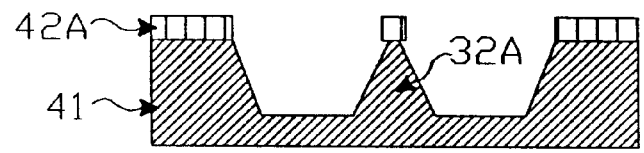
Figure 3:
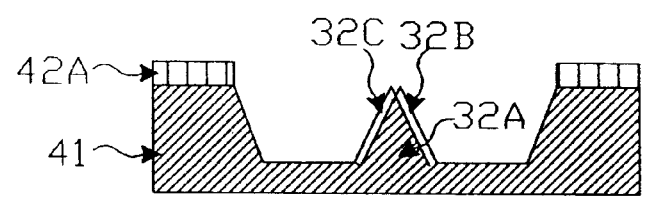
Figure 3:
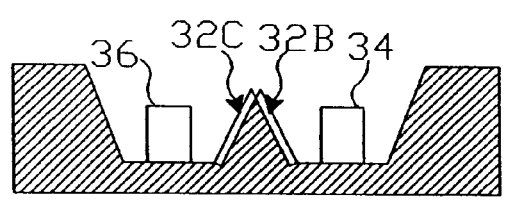

FIGS. 3(A)–3(E) are sectional views for explaining steps in a process of manufacturing an optical source module according to an embodiment of the present invention. In FIG. 3(A), a mask material layer 42 is formed on a surface of a semiconductor substrate 41. The semiconductor substrate 41 is made from a single crystalline silicon while the mask material layer 42 is formed by coating, for example, a silicon oxide, a silicon nitride film, or Au.

Figure 4:
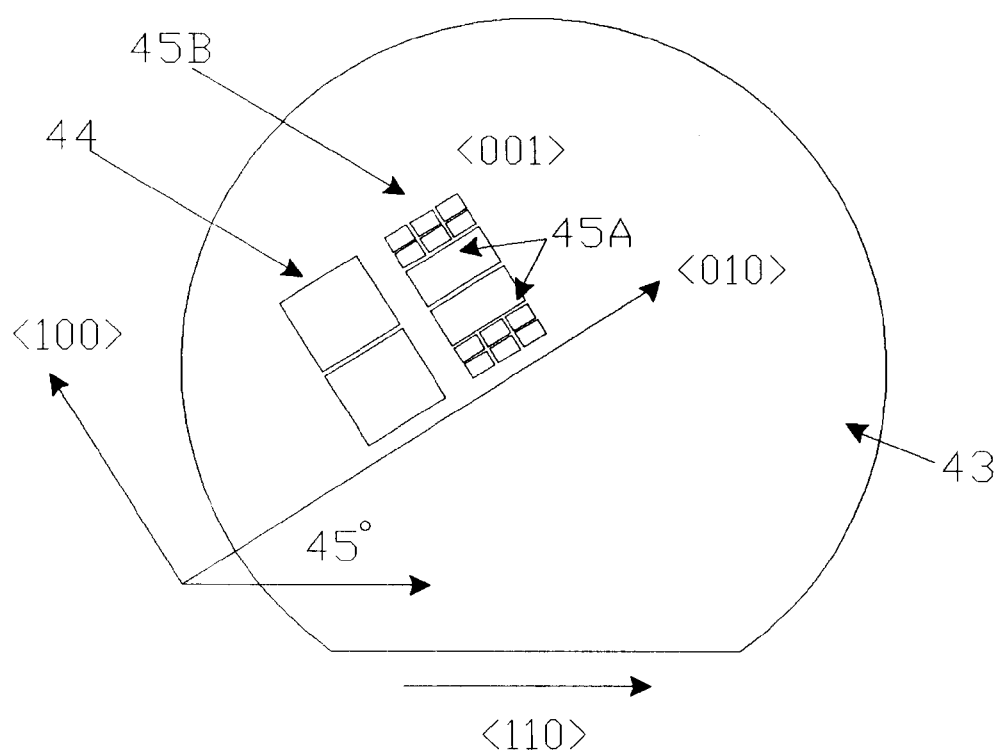
FIG. 4 is a plan view showing a state in which mask patterns shown in FIG. 3(B) and FIG. 5(B) are arranged on a semiconductor or substrate.

Mask material layer 42 is partially exposed to light and developed, to thereby form a mask pattern 42A as shown in FIG. 3(B). This mask pattern 42A defines two rectangular windows 44, which are adjacently arranged on the semiconductor substrate 41 having a face of "001" as shown in FIG. 4 (that is, on the wafer). The windows 44 form a slope having an angle different from the slope defined in the wafer by conventional anisotropic etching. In other words, conventional anisotropic etching allows the wafer 41 to be etched along a "111" face, thereby producing a slope of 57.74°. On the other hand, the windows 44 shown in FIG. 4 control an etching speed of the "100" face and the "110" face to form slopes of 45° on the semiconductor substrate 41. These windows 44 should be formed in consideration of an amount by which the "110" face is undercut in the course of etching the "100" face. A ratio of this undercut is about 9% to 11%.

Next, the surface of the semiconductor substrate 41 left exposed by the mask pattern 42A is etched by anisotropic etching using a echant liquid to define a submount 32A on the surface of the semiconductor substrate 41, as shown in FIG. 3(C). To allow the respective slopes of the submount 32A to have a tilt of 45°, an EDP solution mixturing water and Ethylenediamine pyrocatecol, hereinafter referred to as EDP, is used as the echant liquid. The EDP solution increases an amount of oxidation agent, including a relatively great deal of water. Specifically, if an amount of EDP with respect to water is about 20% to 40%, then the ratio of undercut due to an etching speed difference between the "100" face and the "110" face is about 9% to 11%. In addition, KOH, Hydrazine, Garlic acid and Tetramethtyl ammonium hydroxide solution, etc. may be used as a wet solution.

Referring now to FIG. 3(D), respective sloped portions of the submount 32A are provided with the first and second reflective films 32B and 32C. These reflective films 32B and 32C are formed by utilizing deposition or electric plating to coat a metal material, such as Au or Al, on the sloped portions of the submount 32A.

Further, laser diodes 34 and 36 are provided on the surface of the semiconductor substrate 41 so as to be opposed to the reflective films 32B and 32C, respectively, as shown in FIG. 3(E). Each of these laser diodes 34 and 36 is disposed to be at most contiguous to both reflective films 32B and 32C such that a deviation between optical axes of the light beams reflected by both reflective films 32B and 32C can be minimized.

Finally, the semiconductor substrate 41, on which the laser diodes 34 and 36 and the reflective films 32B and 32C are provided as described above, is mounted on the surface of stem 30 and is thereafter sealed by the cap 38 as shown in FIG. 2, thereby obtaining the present optical source module.

Figure 5A:
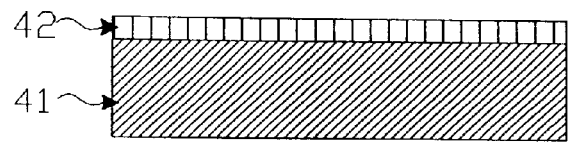
FIGS. 5(A)–5(F) are sectional views for explaining each procedure in a method of manufacturing a different wavelength type of optical source module according to other embodiments of the present invention.

FIGS. 5(A)–5(F) are sectional views illustrating a process of manufacturing the submount in the optical source module according to the present invention. Referring to FIG. 5A, a mask material layer 42 is formed on the surface of semiconductor substrate 41. The semiconductor substrate 41 is made from a single crystal silicon while the mask material layer 42 is formed by coating a silicon oxide, a silicon nitride film, or Au.

Figure 5B:
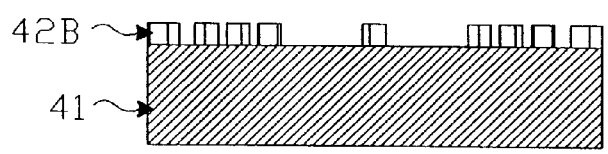
Figure 5C:
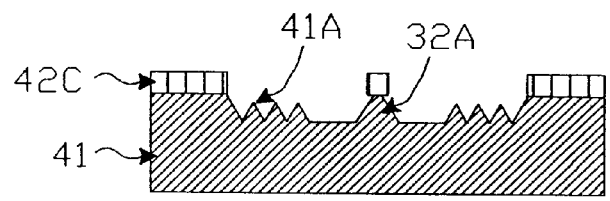
Figure 5D:
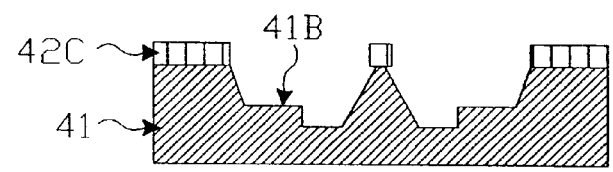

Mask material layer 42 is partially exposed to light and developed, to form a mask pattern 42B as shown in FIG. 5(B). This mask pattern 42B defines two rectangular windows 45A adjacently arranged on the wafer 43 having a face of "001" as shown in FIG. 4, and a number of square windows 45B positioned to the outside of these rectangular windows 45A. Windows 45 are defined to be inclined in the "110" direction, that is, at an angle of 45° with respect to the original wafer surface. Next, the surface of the semiconductor substrate 41 left exposed by mask pattern 42B is etched by anisotropic etching using a echant solution to define a submount 32A and a number of concave and convex portions 41A provided at the periphery thereof on the surface of semiconductor substrate 41, as shown in FIG. 5(C). After the submount 32A and the concave and convex portions 41A are formed, mask pattern 42B positioned on the upper portion of the number of concave and convex portions 41A is removed to defined controlled mask patterns 42C.

The surface of the semiconductor 41 left exposed by the controlled mask pattern 42C is anisotropically etched by the etching solution again to extend sloped portions of the submount 32A and to define middle jaws or stepped portions 41B. This submount 32A is formed to have a slope of 45°.

Figure 5E:
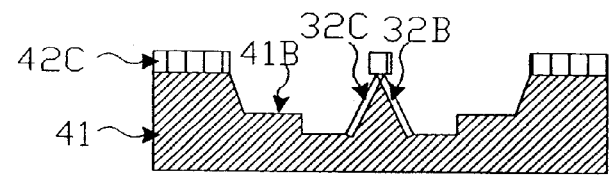

Referring to FIG. 5(E), respective sloped portions of the submount 32A are provided with the first and second films 32B and 32C. Reflective films 32B and 32C are formed by deposition or electric plating to coat a metal material, such as Au or Al, on the sloped portions of the submount 32A.

Figure 5F:
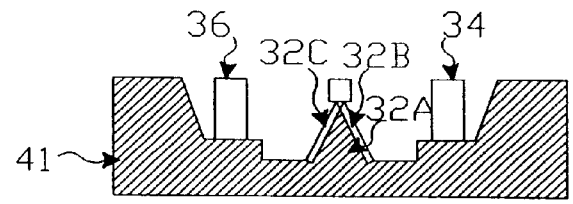

Further, laser diodes 34 and 36 are provided on the respective middle jaws 41B of the semiconductor substrate 41 so as to be opposed to reflective films 32B and 32C, respectively, as shown in FIG. 5(F). Laser diodes 34 and 36 are disposed to be contiguous to both reflective films 32B and 32C such that a deviation between optical axes of the light beams reflected by both reflective films 32B and 32C can be minimized.

Finally, semiconductor substrate 41, on which the laser diodes 34 and 36 and the reflective films 32B and 32C are defined, as described above, is sealed by the cap 38 as shown in FIGS. 2(A) and 2(B), thereby obtaining the optical source module of the present invention.

Figures 6A, 6B:
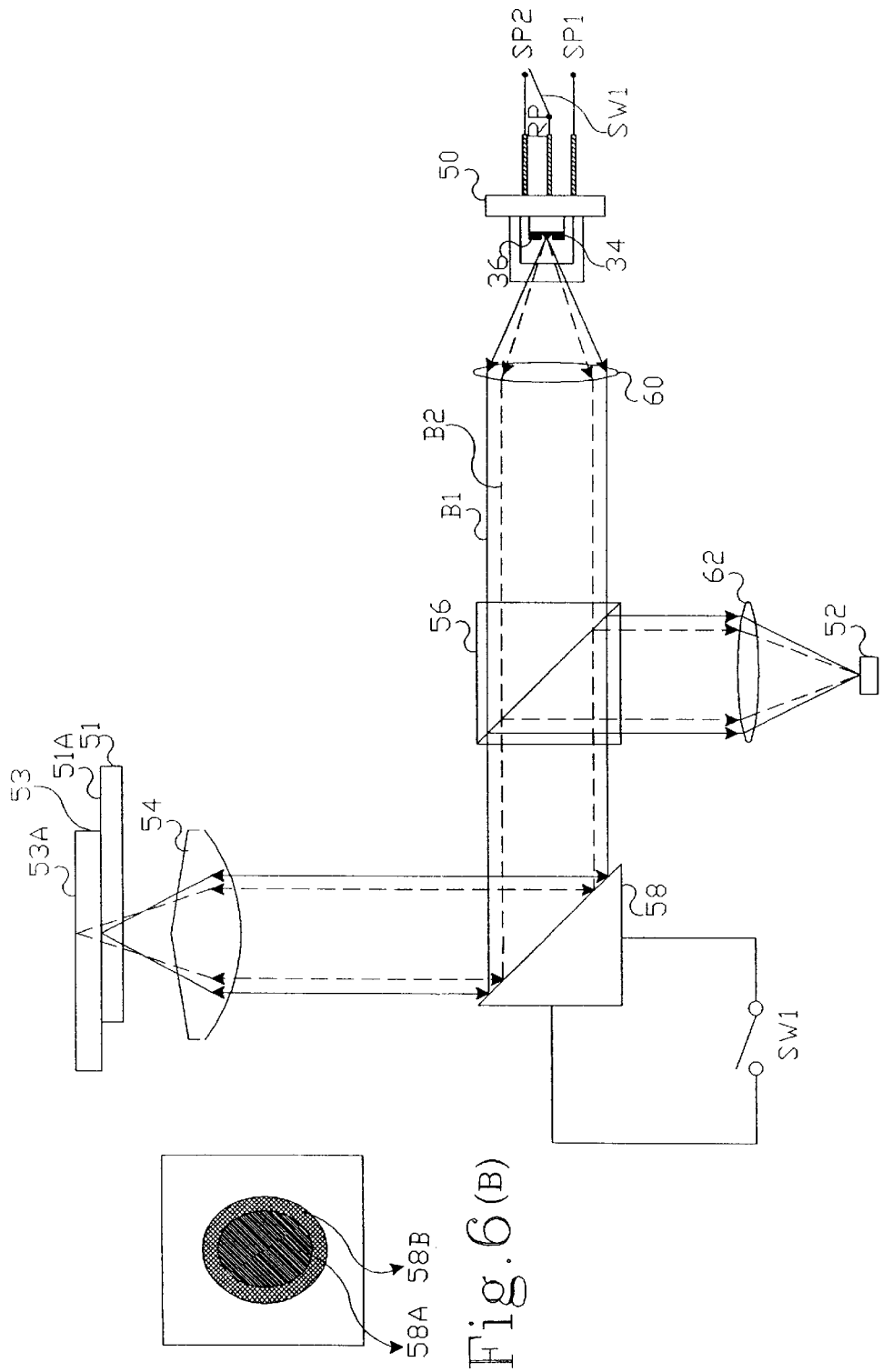
FIGS. 6(A) and 6(B) are sectional views schematically showing a configuration of an optical pickup apparatus employing optical source module according to the embodiments of the present invention.

FIGS. 6(A) and 6(B) are schematic views of a configuration of an optical pickup apparatus employing an optical source module according to an embodiment of the present invention. Referring to now FIG. 6(A), the optical pickup apparatus comprises a type of optical source module 50 for selectively producing first and second light beams B1 and B2, a multiple divisional photo detector 52 for converting light beams reflected by first or second optical disc 51 or 53 into electrical signals, and an objective lens 54 for converging light beams from the optical source module 50 onto an information recording face 51A or 53A of first or second optical disc 51 or 53 into a spot. The optical source module 50 generates a first light beam B1 having a wavelength of 650 nm or a second light beam B2 having a wavelength of 780 nm in accordance with a switching state of first selection switch SW1. The first light beam B1 is generated by the first laser diode 34 when a reference contact RP of the first selection switch SW1 is connected with the first selection contact SP1 thereof. On the other hand, the second light beam B2 is generated by the second laser diode 36 when a reference contact RP of the first selection switch SW1 is connected with the second selection contact SP2 thereof. The first optical disc 51 is a DVD which is relatively shallow with respect to the depth from the surface of the first optical disc 51 to the information recording face 51A thereof, while the second optical disc 53 is a CD or CD-R which is relatively deep with respect to the depth from the surface of second optical disc 53 to the information recording face 53A. Further, the objective lens 54 converges first light beam B1 onto the information recording face 51A of the first optical disc 51 into a spot while it converges second light beam B2 onto the information recording face 53A of the second optical disc 53 into a spot.

Furthermore, the optical pickup apparatus includes a beam splitter 56 positioned in optical alignment with respect to optical source module 50, multi-divisional photo detector 52, and objective lens 54. Beam splitter 56 passes through a portion, i.e., 50%, of the first or second light beam B1 or B2 from the optical source module 50 toward the objective lens 54 and reflects the remaining portion, i.e., 50% of the first or second light beam B1 or B2 at an angle (e.g., 90°) thereto. At this time, first or second light beam B1 or B2 progressing from the optical source module 50 toward the beam splitter 56 is collimated by a collimator lens 60. Further, the beam splitter 56 reflects a portion, i.e., 50%, of the light beam reflected from the first or second optical disc 51 or 53 via the objective lens 54 toward the multi-divisional photo detector 52. At this time, the light beam progressing from the beam splitter 56 toward multi-divisional photo detector 52 is converged onto the surface of multi-divisional photo detector 52 by sensor lens 62. Sensor lens 62 and collimator lens 60 serve to improve an optical sensitivity of the optical pickup apparatus by preventing a leakage of light flux.

Between the objective lens 54 and the beam splitter 56, a perpendicular reflective glass 58 is provided to change the path of the light beam at a right angle. This perpendicular reflective glass 58 controls a size of the flux diameter of the light beam progressing toward the object lens 54, thereby allowing the aperture number of the object lens 54 to be variable. In order words, the perpendicular reflective lens 58 selectively separates light flux at the edge portion of the light beam progressing toward the object lens 54. To this end, the perpendicular reflective glass 58 includes a fixed reflective face 58A, in a shape of ellipse shape, positioned to the center thereof, and a flexible reflective face 58B, in a shape of ellipse band, positioned to the periphery of the fixed reflective face 58A. The fixed reflective face 58A reflects the light beam from the beam splitter 56 and the light beam from the object lens 54 at a right angle. On the other hand, the flexible reflective face 58B reflects the light beam from the beam splitter 56 and the light beam from the objective lens 54 at a right angle or at another angle in accordance with a switching state of the second selection switch SW2. Specifically, the flexible reflective face 58B reflects the light beam from the beam splitter 56 and the light beam from the objective lens 54 at a right angle when the second selection switch SW2 is turned off. At this time, the object lens 54 converges first light beam B1 (represented with solid lines in the drawing) onto the information recording face 51A of the first optical disc 51 into a spot. When the second selection switch SW2 is turned off, the flexible reflective face 58B is curved toward the down direction to thereby reflect the light beam from the beam splitter 56 and the light beam from the objective lens 54 at an angle other than a right angle. In this case, second light beam B2 (represented with dotted lines in the drawing) converges onto the information recording face 53A of the second optical disc 53 into a spot. Further, second selection switch SW2 is turned off when reference contact RP of the first selection switch SW1 is connected with the first selection contact SP1. Second selection switch SW2 is turned on when the reference contact RP of the first selection switch SW1 is connected with the second selection SP2 thereof.

Figure 7:
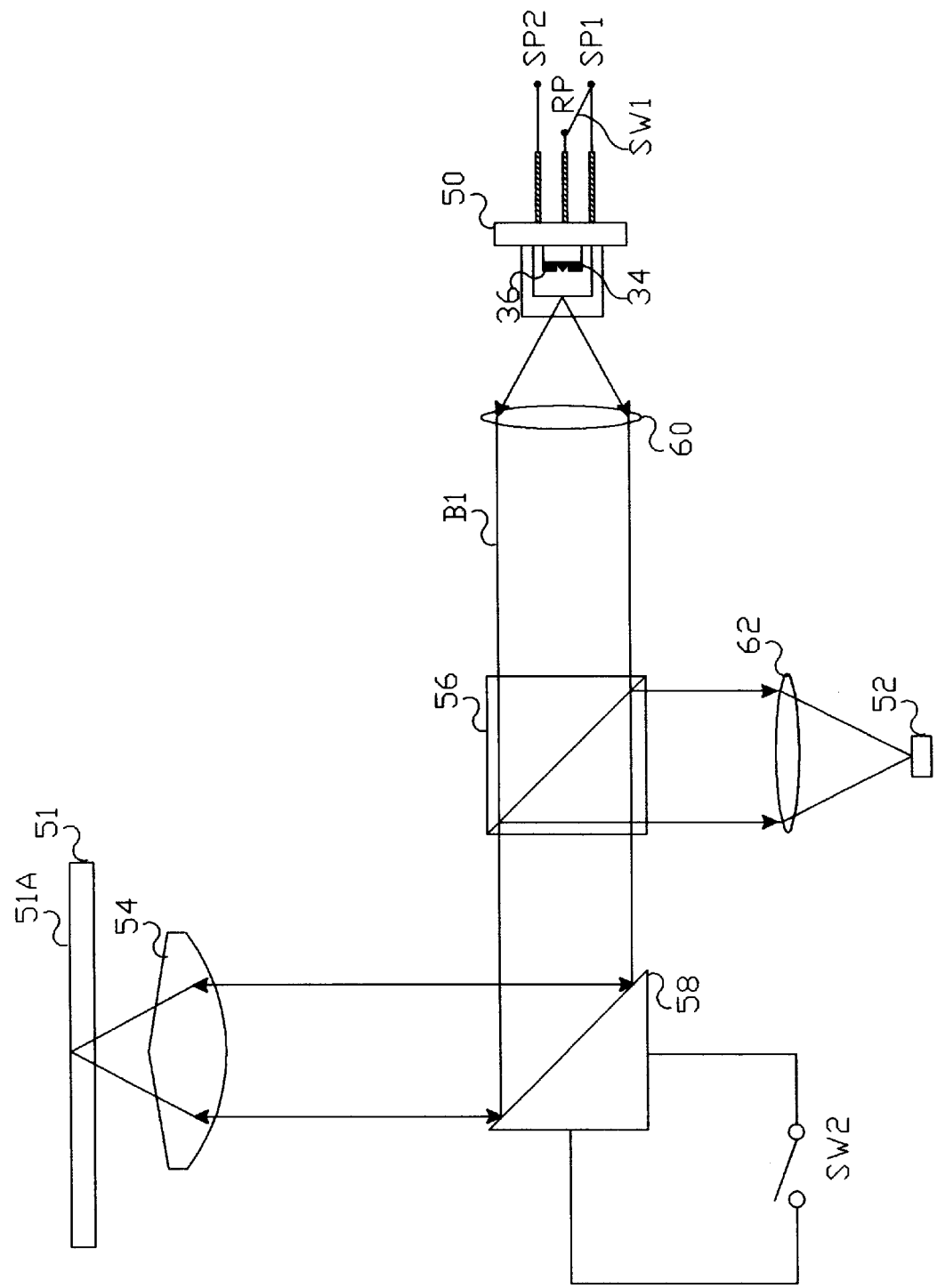
FIG. 7 illustrates an operation of the optical pickup apparatus shown in FIG. 6 when accessing a CD or CD-R.

FIG. 7 illustrates an operation of the optical pickup apparatus according to an embodiment of the present invention when first optical disc 51 shown in FIG. 6 is accessed. In FIG. 7, the reference contact RP of the first selection switch SW1 is connected to the first selection contact SP1 thereof and therefore the second selection switch SW2 is turned off. Accordingly, the first laser diode 34 of the optical source module 50 generates first light beam B1 having a wavelength of 650 nm. Further, the perpendicular reflective glass 58 reflects all the first light beam B1 from the optical source module 50 via the collimator lens 54. As a result, the objective lens 54 maintains a relatively large aperture number. Further, the first light beam B1 is converged onto the information recording face 51A of the first optical disc 51 into a spot by the objective lens 54 maintaining the relatively large aperture number. Subsequently, the first light beam B1 reflected by the information recording face 51A of the first optical disc 51 arrives at the multi-divisional photo detector 52 by way of the objective lens 54, the perpendicular reflective glass 58, the beam splitter 56, and the sensor lens 62. Accordingly, a corresponding electrical signal is generated by the multi-divisional photo detector 52.

Figure 8:
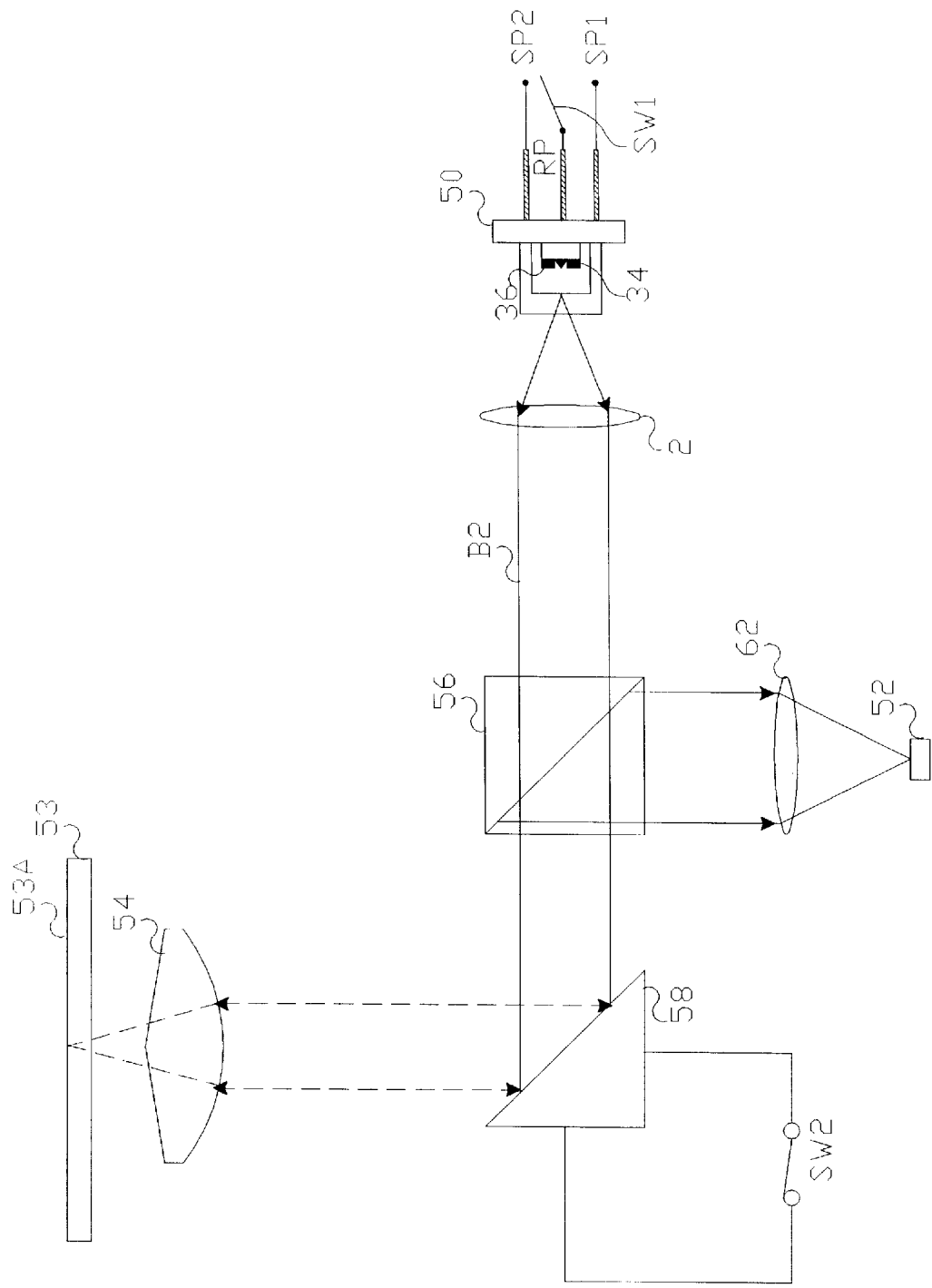
FIG. 8 illustrates an operation of the optical pickup apparatus shown in FIG. 6 when accessing a DVD.

FIG. 8 illustrates an operation of the optical pickup apparatus according to an embodiment of the present invention when second optical disc 53 shown in FIG. 6 is accessed. In FIG. 8, the reference contact RP of the first selection switch SW1 is connected to the second selection contact SP2. Therefore, the second selection switch SW2 is turned on. Accordingly, the second laser diode 34 of optical source module 50 generates second light beam B2 having a wavelength of 780 nm. Further, the perpendicular reflective glass 58 reflects light flux at the edge portion of the second light beam B2 at an angle other than at a right angle while it reflects light flux in the center portion of second light beam B2 toward the objective lens 54. As a result, the object lens 54 maintains a relatively small aperture number. Further, the second light beam B2 is converted onto the information recording face 53A of the first optical disc 53 into a spot by the objective lens 54 maintaining the relatively small aperture number. Subsequently, the second light beam B2 reflected by the information recording face 53A of the second optical disc 53 arrives at the multi-divisional photo detector 52 by way of the object lens 54, the perpendicular reflective glass 58, the beam splitter 56, and the sensor lens 62 in turn. Accordingly, a corresponding electrical signal is generated by the multi-divisional photo detector 52.

As described above, according to the present invention, two reflective sloped faces are provided to define a shape of a mountain, and laser diodes are arranged to be in opposition to the reflective faces, thereby providing an optical source module generating light beams which have the same path but are different in their wavelengths, with respect to each other. The optical source module can be mass-produced by a general semiconductor manufacturing process.

Further, an optical pickup apparatus employing the optical source module utilizes light beams having different wavelengths, so that it can access CD, CD-R, and DVD media accurately. Also, the optical pickup apparatus can obviate optical devices need to match progressing paths of two light beams as in the conventional art, so that the device has a simplified configuration as well as minimal bulk.

Although the present invention has been explained by the embodiments shown in the drawings hereinbefore, it should be understood to the ordinary skilled person in the art that the invention is not limited to the embodiments, but rather than that various changes or modifications thereof are possible without departing from the spirit of the invention. Accordingly, the scope of the invention shall be determined only by the appended claims and their legal equivalents.

What is claimed is:

1. An optical source module, comprising:

first and second reflective films arranged on respective first and second surfaces having an adjoining edge and being at an angle relative to each other; and first and second light sources provided to be opposed to said first and second reflective films, respectively, for generating light beams having different wavelengths, respectively.

2. The optical source module as set forth in claim 1, wherein said first and second reflective surfaces are inclined at an angle of 45°.

3. The optical source module as set forth in claim 1, wherein said first light source generates a light beam having a wavelength of 650 nm and said second light source generates a light beam having a wavelength of 780 nm.

4. An optical source module, comprising:

a support on which a submount is defined, said submount having at least two sloped portions;

at least two reflective films formed on respective ones of said at least two sloped portions; and at least two light sources provided on a surface of said support so as to be opposed to respective ones of said at least two reflective films.

5. The optical source module as set forth in claim 4, wherein said support is made from a semiconductor material.

6. The optical source module as set forth in claim 4, wherein each of said at least two reflective films is inclined at an angle of 45°.

7. An optical source module, comprising:

a submount having at least two sloped portions;

at least two reflective films formed on respective ones of said at least two sloped portions;

a support member for supporting said submount, said support member including at least two raised jaws provided at a higher level than a lower end of said submount, at positions opposed to each of said at least two sloped portions; and at least two light sources provided on respective ones of said at least two jaws to generate light beams having different respective wavelengths.

8. The optical source module as set forth in claim 7, wherein said support member is made from a semiconductor material.

9. The optical source module as set forth in claim 7, wherein each of said at least two reflective films is inclined at an angle of 45°.

10. A method of manufacturing an optical source module comprising the steps of:

defining a submount having at least two sloped portions on a semiconductor substrate;

forming reflective films on each of said at least two sloped portions; and providing at least two light sources on the semiconductor substrate so as to be opposed to said at least two sloped portions, respectively.

11. The method as set forth in claim 10, wherein the semiconductor substrate is made from a single crystal silicon having a face of "110".

12. The method as set forth in claim 11, wherein said step of defining said submount includes forming a mask pattern on the semiconductor substrate to define at least two windows, and anisotropically etching a surface of the semiconductor substrate exposed by the at least two windows.

13. The method as set forth in claim 12, wherein said step of forming a mask pattern includes defining the at least two windows at an angle of 45° with respect to the crystal direction of "110" of the single crystal silicon.

14. The method as set forth in claim 12, wherein said step of anisotropic etching uses an Ethylenediamine Pyrocatecol solution as an etchant.

15. The method as set forth in claim 10, wherein said reflective films are formed by depositing a metal material on the at least two sloped portions.

16. The method as set forth in claim 10, wherein said reflective films are formed by electroplating a metal material on the at least two sloped portions.

17. The method as set forth in claim 16, wherein the metal material is Au.

18. The method as set forth in claim 16, wherein the metal material is Al.

19. A method of manufacturing an optical source module comprising the steps of:

defining a submount having at least two sloped portions on a semiconductor substrate;

forming at least two raised jaws to be at a higher than a lower end of the submount, at a position on the semiconductor substrate opposite each of the at least two sloped portions;

forming reflective films on each of the at least two sloped portions; and providing at least two light sources on respective ones of the at least two jaws.

20. The method as set forth in claim 19, wherein the semiconductor substrate is made from a single crystal silicon having a face of "110".

21. The method as set forth in claim 20, wherein said step of defining the submount includes forming a mask pattern on the semiconductor substrate to define at least two windows, and anisotropically etching the surface of the semiconductor substrate left exposed by the at least two windows.

22. The method as set forth in claim 21, wherein said step of forming the at least two raised jaws includes removing a part of the mask pattern, and thereafter anisotropically etching the semiconductor substrate exposed by the remaining part of the mask pattern.

23. The method as set forth in claim 21, wherein said step of forming the mask pattern includes defining the at least two windows at an angle of 45° with respect to the crystal direction of "110" in the single crystal silicon.

24. The method as set forth in claim 21, wherein said step of anisotropic etching uses an Ethylenediamine Pyrocatecol solution as an etchant.

25. The method as set forth in claim 19, wherein the reflective films are formed by depositing a metal material on the at least two sloped portions.

26. The method as set forth in claim 19, wherein the reflective films are formed by electroplating a metal material on the at least two slopes.

27. The method as set forth in claim 26, wherein the metal material is Au.

28. The method as set forth in claim 26, wherein the metal material is Al.

29. An optical pickup apparatus, comprising:
an optical source module for generating light beams having different wavelengths depending upon a respective optical disc, said optical source module including:
first and second reflective films arranged on respective first and second surfaces having an adjoining edge and being at an angle relative to each other; and
first and second light sources provided to be opposed to said first and second reflective films, respectively, for generating light beams having different wavelengths, respectively;
convergence means for converging the light beams from said optical source module onto a surface of the optical disc;
a photo detector for converting light beams reflected by the optical disc into electrical signals; and
optical separation means arranged among said convergence means, said optical source module, and said photo detector means, for delivering the light beams from said optical source module to said convergence means, and the light beams reflected by the optical disc, via said convergence means, to said photo detector.

30. An optical pickup apparatus, comprising:
an optical source module for generating light beams having different wavelengths depending upon a respective optical disc, said optical source module including:
a support means on which a submount is defined, said submount having at least two sloped portions;
at least two reflective films formed on respective ones of said at least two sloped portions; and
at least two light sources provided on a surface of said support so as to be opposed to respective ones of said at least two reflective films;
convergence means for converging the light beams from said optical source module onto a surface of the optical disc;
a photo detector for converting light beams reflected by the optical disc into electrical signals; and
optical separation means arranged among said convergence means, said optical source module, and said photo detector means for delivering the light beams from said optical source module to said convergence means, and the light beams reflected by the optical disc via said convergence means, to said photo detector.

31. An optical pickup apparatus, comprising:
an optical source module for generating light beams having different wavelengths depending upon a respective optical disc, the optical source module including:
first and second reflective films arranged on respective first and second surfaces having an adjoining edge and being at an angle relative to each other; and
first and second light sources provided to be opposed to said first and second reflective films, respectively, for generating light beams having different wavelengths, respectively;
light path means for guiding the light beams from said optical source module toward the optical disc and the light beams reflected by the optical disc from the optical disc, respectively; and
a photo detector for converting the reflected light beams from the light path means into electrical signals.

32. An optical pickup apparatus, comprising:
an optical source module for generating light beams having different wavelengths depending upon a respective optical disc, said optical source module including:
a support on which a submount is defined, said submount having at least two sloped portions;
at least two reflective films formed on respective ones of said at least two sloped portions; and
at least two light sources provided on a surface of said support so as to be opposed to respective ones of said at least two reflective films;
light path means for guiding the light beams from said optical source module toward the optical disc and the light beans reflected by the optical disc toward said photo detector means, respectively; and
a photo detector for converting light beams reflected by the optical disc into electrical signals.

* * * * *